(12) United States Patent
Glover

(10) Patent No.: US 6,188,330 B1
(45) Date of Patent: Feb. 13, 2001

(54) WINDSHEAR DETECTION SYSTEM

(75) Inventor: J. Howard Glover, Bellevue, WA (US)

(73) Assignee: AlliedSignal, Inc., Morristown, NJ (US)

(*) Notice: Under 35 U.S.C. 154(b), the term of this patent shall be extended for 0 days.

(21) Appl. No.: 09/495,631

(22) Filed: Feb. 1, 2000

Related U.S. Application Data

(60) Provisional application No. 60/118,202, filed on Feb. 1, 1999.

(51) Int. Cl.[7] .................................................. G08B 23/00
(52) U.S. Cl. .............................. 340/968; 340/963; 342/26
(58) Field of Search .................................... 340/968, 949, 340/963, 967; 342/26; 701/7, 9, 14

(56) References Cited

U.S. PATENT DOCUMENTS

| | | | | |
|---|---|---|---|---|
| 4,725,811 | * | 2/1988 | Muller et al. | 340/968 |
| 4,853,861 | * | 8/1989 | Ford et al. | 340/968 |
| 4,891,642 | * | 1/1990 | Muller | 340/968 |
| 5,053,767 | * | 10/1991 | Zweifel et al. | 340/968 |

* cited by examiner

Primary Examiner—Brent A. Swarthout

(57) ABSTRACT

A method and apparatus for detecting in situ windshear on-board an aircraft that utilizes parameters provided by standard on-board Air Data, Flight Management, and Stall Detection Systems. No on-board accelerometers are required.

5 Claims, 2 Drawing Sheets

WINDSHEAR DETECTION SYSTEM

CROSS-REFERENCE TO RELATED APPLICATION

This application claims priority from provisional application No. 60/118,202, filed Feb. 1, 1999, the disclosure of which is incorporated herein by reference.

BACKGROUND OF THE INVENTION

Improved techniques for detecting windshear are necessary to improve air safety. An aircraft encountering windshear during take-off or landing is in great danger. However, the danger may be substantially reduced if the pilot immediately takes remedial action when windshear is experienced, e.g., by initiating a rapid climb on take off or aborting a landing and making a go around.

Systems for detecting windshear experienced by an airplane exist, e.g., a windshear detection system which is integrated into the GPWS (Ground Proximity Warning System) Mk V and Mk VII and the Enhanced GPWS Mk V and Mk VII manufactured by the assignee of the present application. However, these and other existing on-board windshear detection systems require input of aircraft normal acceleration (an) and longitudinal acceleration (ax). On many types of aircraft, these acceleration signals can only be provided by installing two high quality (and relatively expensive) precision accelerometers on the aircraft.

Since windshear presents a danger to all aircraft it is important to provide on-board windshear detection systems which are available to aircraft which do not have high quality accelerometers on board.

SUMMARY OF THE INVENTION

The present invention describes a windshear detection system and method that does not require aircraft acceleration signals. According to one aspect of the invention, data available from standard on-board instruments is utilized to compute a close approximation of the windshear experienced by the aircraft.

According to another aspect of the invention, true aircraft speed, aircraft inertial ground speed, aircraft attack speed, aircraft angle of attack, and aircraft pitch and roll attitude magnitudes are input as parameters and utilized to compute a close approximation of altitude.

According to another aspect of the invention, the difference between the inertial ground speed and true airspeed is input to a high pass filter and then subtracted from the output of the high pass filter to approximate the rate of change of the difference.

Other features and advantages of the invention will be apparent from the following detailed description and appended drawings.

DESCRIPTION OF THE SPECIFIC EMBODIMENTS

Figure 1:
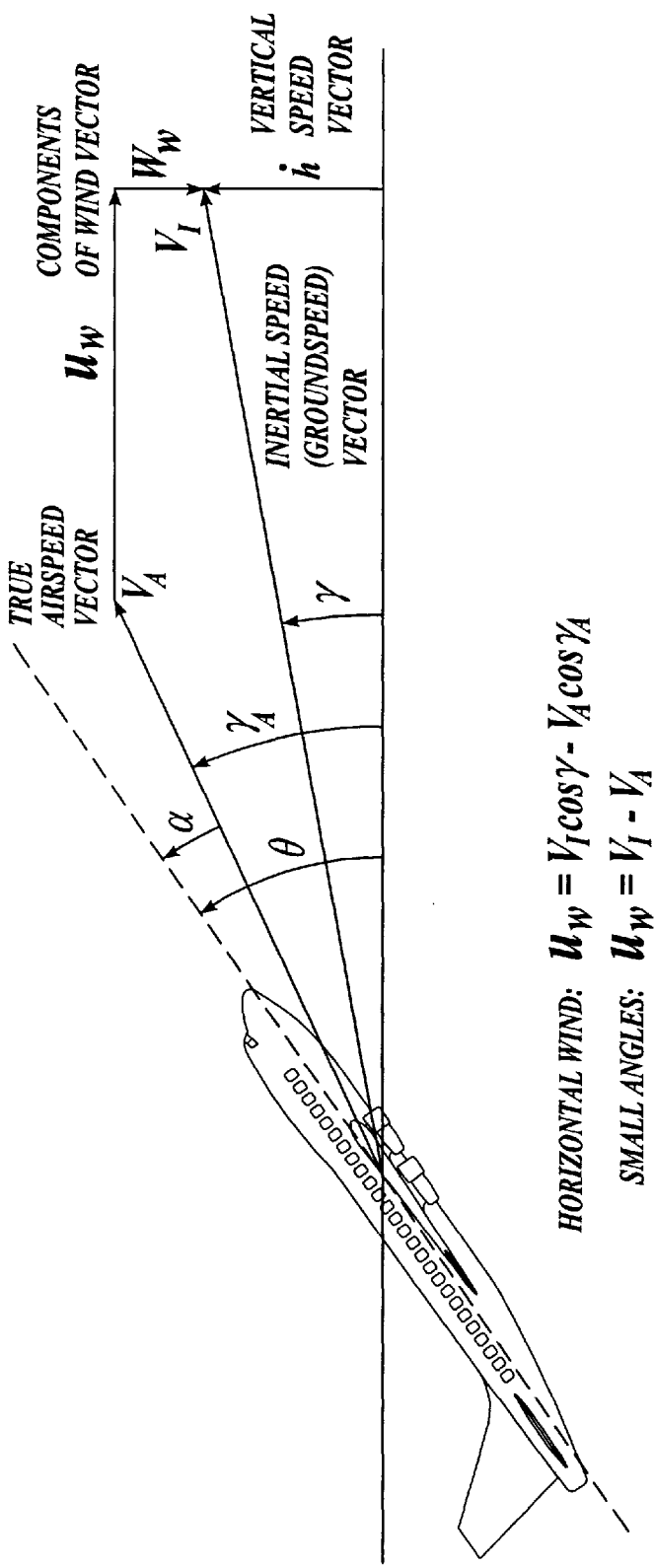
FIG. 1 is a diagram depicting parameters for measuring windshear used in a preferred embodiment of the invention.

A vector diagram illustration the system concept is shown in FIG. 1. The purpose of the detection system is to measure the intensity of a windshear, and to provide an alert to the pilot. The well-known formula defining a windshear intensity (described by R. Bowles et al of NASA) is:

$$F = \frac{\dot{u}_w}{g} + \frac{w_w}{V_A}$$

Where:
F is the intensity of the windshear in acceleration units ('g'),
$\dot{u}_w$ is the time rate of change of the horizontal component of the wind (feet/second)
g is the acceleration due to gravity (feet/second$^2$)
$w_w$ is the magnitude of the vertical component of the wind (feet/second$^2$)
$V_A$ is the magnitude of the True Airspeed of the aircraft (feet/second)

The above equation expresses windshear in terms of wind speed and rate of change of windspeed. However, wind speed parameters are not supplied by standard onboard equipment.

Typical on board equipment includes an Air Data System for measuring atmospheric quantities and air speed, a Stall Warning System or angle of attack transducer for providing angle of attack data, and a Flight Management System. The Flight Management System does not include sensors but processes data received from the Air Data System and other on-board systems as well as other data received by radio such as GPS information. Aircraft also have on board either an Inertial Reference System or a gyroscope for providing data regarding pitch and roll attitude.

A preferred embodiment of the alerting system functions by continuously testing a computed value of F against a pre-determined threshold value, and by issuing an alert to the pilot (either as visual or aural alert, or a combination of the tow) if the threshold value is exceeded. The new detection algorithm solves a close approximation to the above F-1 Factor formula based on the following equation show in FIG. 1, $$\frac{\dot{u}_w}{g} + \frac{w_w}{V_A} = \frac{1}{g}\frac{d}{dt}(V_1 - V_A) + (\theta - \alpha \cdot \cos\phi) - \frac{\dot{h}}{V_A}$$

where $$\frac{1}{g}\frac{d}{dt}(V_1 - V_A)$$

is the horizontal component of windshear and $$(\theta - \alpha \cdot \cos\phi) - \frac{\dot{h}}{V_A}$$

is the vertical component of windshear.

Figure 2:
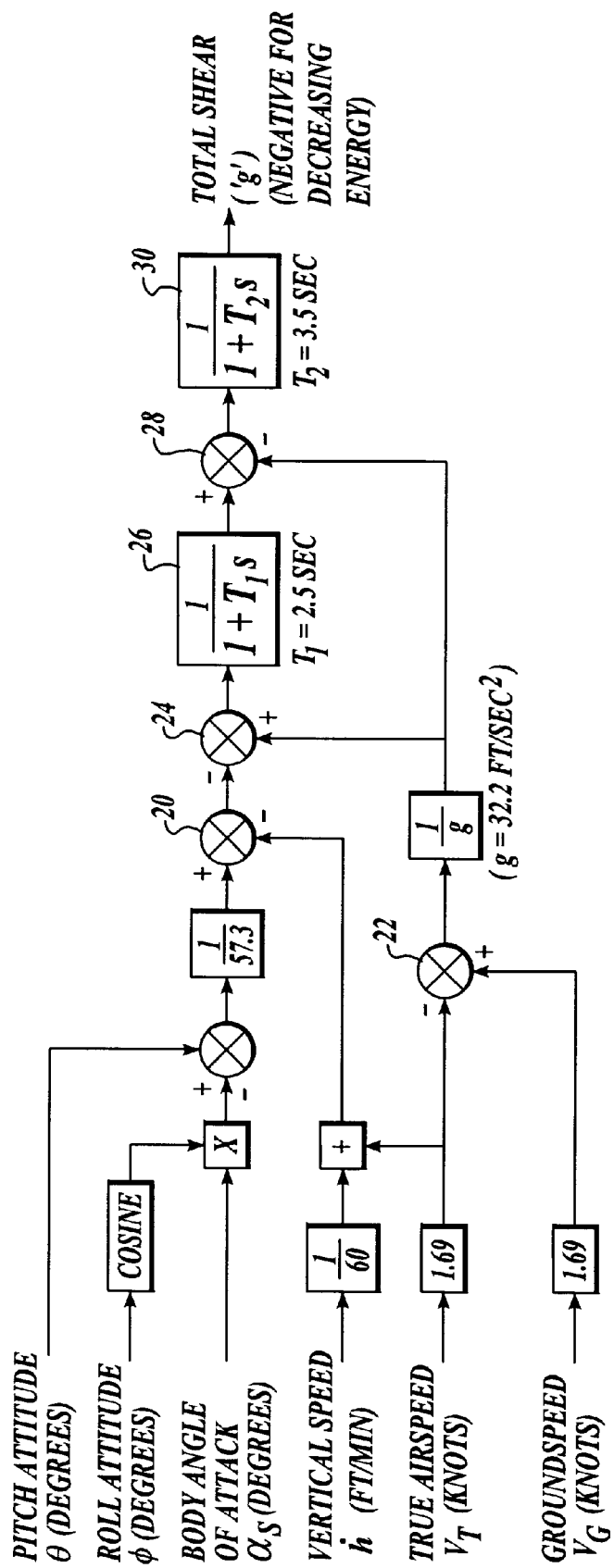
FIG. 2 is diagram of a preferred embodiment for implementing the windshear computing algorithm.

The above equation uses the following inputs:
Aircraft true airspeed ($V_A$) from the Air Data System
Aircraft inertial groundspeed ($V_I$) from the GPS receiver of Flight Management System
Aircraft vertical speed ($\dot{h}$) from the Air Data System
Aircraft angle of attack ($\alpha$) from the angle of attack transducer (or the Stall Warning System)
Aircraft pitch attitude ($\theta$) from the vertical gyro or the Inertial Reference System Aircraft roll attitude (φ) from the vertical gyro or the Inertial Reference System A Block diagram of the detection system is shown in FIG. 2. The above listed inputs are provided to the system at the right of the Figure. In FIG. 2, the output of a first summing node 20 is equal to the vertical component of windshear. The output of a second summing node 22 is equal to a difference quantity ($V_I$-$V_A$). The vertical component and the difference quantity are summed at a third summing node 24 and input to a filter 26. The output of the filter 26 is input to the + input of a fourth summing node 28 and the difference quantity is input to the − input of the fourth summing node 28. The output of the fourth summing node is filtered by filter 30 which has an output providing the total shear.

In the detection system of FIG. 2. windshear which is due to the rate of change of horizontal wind is approximated by high-pass filtering the difference between True Airspeed and Groundspeed. The high pass filter for the horizontal windshear component is formed by the third summing node 24, filter 26, and fourth summing node 28. The filter 26 is a low-pass filter, however, because the output of the filter 28 is subtracted from the difference quantity at the fourth summing node 28 to remove high frequencies so that the output of the fourth summing node 28 is low-pass filtered. Note that the difference quantity is input to the filter and then subtracted from the output of the filter, which is a delayed version of the input, to form a differential output value. The filter output is in phase with the input, because filter 26 was implemented as a low-pass filter, so that the subtraction at the fourth summing node 28 accurately generates the differential output signal. The high pass filter time constant (T1) is chosen to minimize the effects of turbulence on the system.

The vertical component of windshear is computed from pitch attitude, roll attitude, angle of attack and vertical speed, and is then passed through the same low-pass filter 26 (time constant T1) which forms part of the high-pass filter for the horizontal component of shear. This assures that the phase shift (delay) introduced by the filter process is equivalent for the horizontal and vertical components of shear. A final filter (T2) 30 further reduces the effects of transients and turbulence on the computed shear value.

In this embodiment the horizontal and vertical components of shear are not separately computed: the final total shear value is a combination of the components, and the individual components are not available at any point in the computation process.

The "total shear" value is passed to a comparator (not shown) whose threshold is a function of aircraft type and aircraft configuration (takeoff or landing). When the "total shear" value exceeds the threshold value, the system provides an aural and/or visual alert to the pilot. In a preferred embodiment, the system of FIG. 2 is implemented in software which is executed by a processor included in an airborne ground proximity warning system.

The invention has now been described with reference to the preferred embodiments. Alternatives and substitutions will now be apparent to persons of skill in the art. For example, specific sources have been described for the input signals to the system. However, these input signals may be provided from other sources without affecting the scope of the invention. Additionally, different combinations of signal processing and filtering techniques would be apparent to persons of skill in the art. Accordingly it is not intended to limit the invention except as provided by the appended claims.

What is claimed is:

1. A method for computing the magnitude of windshear experienced by an aircraft, with the method implemented by a computer on board the aircraft and with aircraft including on-board systems to obtain the current values of the true air speed, aircraft inertial groundspeed, aircraft vertical speed, aircraft angle of attack, aircraft pitch attitude, and aircraft roll attitude, said method comprising the acts of:

processing the true air speed, aircraft vertical speed, aircraft angle of attack, and aircraft pitch attitude, and aircraft roll attitude to form a current value of vertical wind shear;

forming a difference value equal to the difference of aircraft true speed and aircraft inertial groundspeed;

determining the rate of change of the difference value to form an approximation of a current value of horizontal windshear;

combining the current values of vertical and horizontal windshear to form an approximation of a current value of total windshear without requiring measurement of aircraft acceleration; and comparing the approximation of the current value of total windshear to a threshold to determine whether to issue a windshear alarm.

2. A computer program product for computing the magnitude of windshear experienced by an aircraft, with the method implemented by a computer on board the aircraft and with aircraft including on-board systems to obtain the current values of the true air speed, aircraft inertial groundspeed, aircraft vertical speed, aircraft angle of attack, aircraft pitch attitude, and aircraft roll attitude, said computer program product comprising:

a computer readable storage structure embodying computer program code thereon, with said computer program code comprising:

computer program code for causing a computer to process the true air speed, aircraft vertical speed, aircraft angle of attack, and aircraft pitch attitude, and aircraft roll attitude to form a current value of vertical wind shear;

computer program code for causing a computer to form a difference value equal to the difference of aircraft true speed and aircraft inertial groundspeed;

computer program code for causing a computer to determine the rate of change of the difference value to form an approximation of a current value of horizontal windshear;

computer program code for causing a computer to combine the current values of vertical and horizontal windshear to form an approximation of a current value of total windshear without requiring measurement of aircraft acceleration; and computer program code for causing a computer to compare the approximation of the current value of total windshear to a threshold to determine whether to issue a windshear alarm.

3. A method for computing the magnitude of windshear experienced by an aircraft, with the method implemented by a computer on board the aircraft and with aircraft including on-board systems to obtain the current values of the true air speed, aircraft inertial groundspeed, aircraft vertical speed, aircraft angle of attack, aircraft pitch attitude, and aircraft roll attitude, said method comprising the acts of:

processing the true air speed, aircraft vertical speed, aircraft angle of attack, and aircraft pitch attitude, and aircraft roll attitude to form a current value of vertical wind shear;

forming a difference value equal to the difference of aircraft true speed and aircraft inertial groundspeed;

subtracting a current difference value from a delayed difference value to form an approximation of a current value of horizontal windshear;

combining the current values of vertical and horizontal windshear to form an approximation of a current value of total windshear.

4. The method of claim 3 further comprising the acts of:

high-pass filtering and low-pass filtering the difference value to eliminate the effects of turbulence on the value of the approximation.

5. A computer program product for computing the magnitude of windshear experienced by an aircraft, with the method implemented by a computer on board the aircraft and with aircraft including on-board systems to obtain the current values of the true air speed, aircraft inertial groundspeed, aircraft vertical speed, aircraft angle of attack, aircraft pitch attitude, and aircraft roll attitude, said computer program product comprising:

a computer readable storage structure embodying computer program code thereon, with said computer program code comprising:

computer program code for causing a computer to process the true air speed, aircraft vertical speed, aircraft angle of attack, and aircraft pitch attitude, and aircraft roll attitude to form a current value of vertical wind shear;

computer program code for causing a computer to form a difference value equal to the difference of aircraft true speed and aircraft inertial groundspeed;

computer program code for causing a computer to subtract a current difference value from a delayed difference value to form an approximation of a current value of horizontal windshear; and computer program code for causing a computer to combine the current values of vertical and horizontal windshear to form an approximation of a current value of total windshear.

\* \* \* \* \*